O. W. HART.
ROLLER BEARING.
APPLICATION FILED JULY 6, 1917.

1,270,820.

Patented July 2, 1918.

INVENTOR
Orlando W. Hart
by William A. Hardy.
HIS ATTY.

UNITED STATES PATENT OFFICE.

ORLANDO W. HART, OF FALL RIVER, MASSACHUSETTS.

ROLLER-BEARING.

1,270,820.  Specification of Letters Patent.  Patented July 2, 1918.

Application filed July 6, 1917. Serial No. 178,910.

*To all whom it may concern:*

Be it known that I, ORLANDO W. HART, a citizen of the United States, and a resident of Fall River, Bristol county, Massachusetts, have invented certain new and useful Improvements in Roller-Bearings, of which the following is a description.

My invention relates to roller bearings and more particularly to the type of roller bearings described and claimed in Patent #1,205,449 granted to me on November 21, 1916.

One of the objects of my invention is to provide an improved construction, whereby the parts of a roller bearing will be maintained in proper relative or assembled position upon the separation of the relatively rotatable members, between which the roller bearing is positioned, or the removal of one of these members from operative position with respect to the other member, and whereby any substantial relative movement of the parts of the bearing during the operation thereof, will be effectively prevented.

Another object of my invention is a simple and efficient provision for taking up side or end thrusts, especially in an arrangement having the construction just described.

A further object of the invention is to employ means for attaining these objects, the use of which will be accompanied with a minimum of wear and friction of the parts of the roller bearing in the operation of the latter.

My invention also contemplates an improved construction whereby lubricant is adapted to be retained in position to be circulated through the bearing in the operation of the latter.

Other objects and features of my invention reside in the construction and combination of parts hereinafter more fully described and claimed.

For a clearer understanding of my invention, attention is directed to the drawing accompanying and forming a part of this specification, in the several views of which corresponding parts are designated by the same reference characters, and in which.

Figure 1:
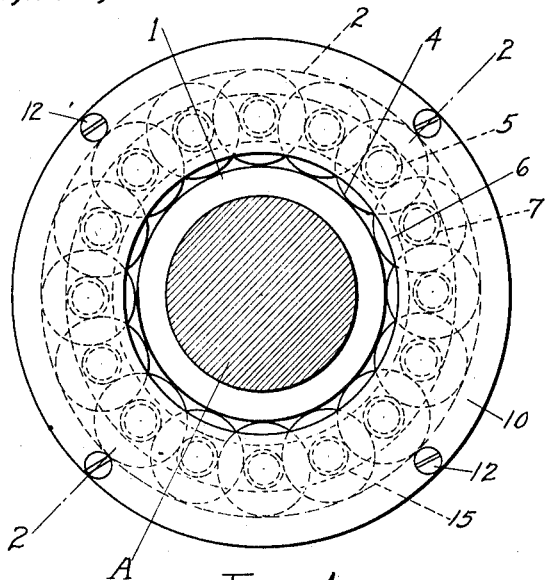
Figure 1 is a view in end elevation, partly in section, of a construction embodying my invention, showing a roller bearing assembled about a shaft.
Figure 2:
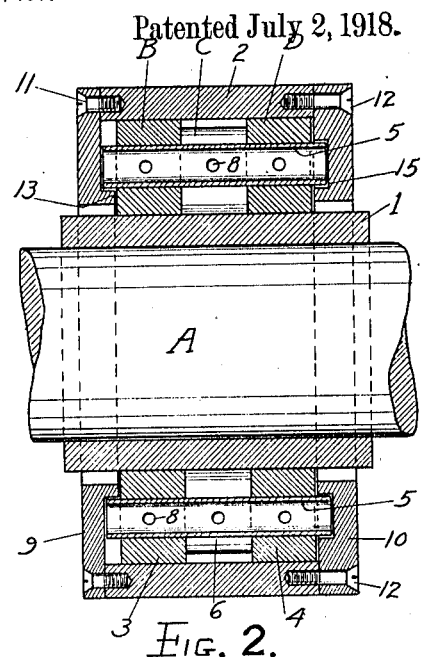
Fig. 2 is a sectional view, partly in elevation, taken on line 2—2 of Fig. 1.

Referring to Figs. 1 and 2, reference character A represents a shaft having rigidly secured thereto, in any suitable manner, a hardened cylindrical bearing member or sleeve 1. Reference character 2 represents a hardened cylindrical outer bearing member or sleeve which is adapted to be rigidly secured within the hub of a wheel, or within a stationary journal box where the shaft A is rotatable. A plurality of annular series of rolls, three such series, B, C, and D, being shown are disposed between the inner and outer bearing members 1 and 2 which form runways therefor. The corresponding pairs of rolls 3 and 4 of the alternate series of the bearings, that is the two outer series B and D in the bearing shown, are respectively loosely mounted on hollow alining shafts 5, while the rolls 6 of the intermediate series C are respectively loosely mounted on hollow alining shafts 7. The shafts 5 and 7 are parallel to the axis of the bearing, and, for a purpose hereinafter described, are somewhat longer than the combined width of series B, C and D. The rolls and alining shafts of each series respectively coact with the alining shafts and rolls of every adjacent series, when the bearing is assembled, to maintain the rolls of adjacent series staggered, in the manner described in Patent #1,205,449 referred to above. The alining shafts 5 and 7 are preferably provided with perforations 8 whereby in the rotation of the rolls about the alining shafts and in the rotation of the series of rolls about the axis of the bearing, lubricant supplied to the bearing will be thoroughly circulated through the bearing and distributed to all parts thereof.

A pair of inwardly extending annular plates 9 and 10 are respectively secured to the ends of the outer bearing member or sleeve 2 in fluid tight engagement therewith in any suitable manner, as by screws 11 and 12. The outer peripheries of plates 9 and 10 are flush with the outer surface of sleeve 2 while the inner peripheries of these plates are slightly spaced from the inner bearing member or sleeve 1.

The plate 9 is provided with an inner annular lip or rim 13 extending closely adjacent the corresponding end rolls of the bearing, and the plate 10, which lies close to the adjacent end rolls of the bearing, is provided with an annular groove 15 in which the corresponding extending end portions of the alining shafts 5 and 7 are loosely disposed.

With the construction shown in Figs. 1 and 2 it will be seen that the plates 9 and 10 prevent any substantial relative longitudinal movement of the rolls and alining shafts 5 and 7. In case it is desired to take care of end or side thrusts, the plates 9 and 10 are made of sufficiently heavy stock to transmit end thrusts imposed on the roller bearing by shaft A and sleeve 1, to the sleeve 2. The annular lip 13 of plate 9 and the inner annular lip of plate 10 formed by groove 15, respectively coact with the extending end portions of the alining shafts 5 and 7 to prevent collapsing or relative displacement of the rolls and alining shafts of the bearing and to thereby maintain the parts of the bearing properly assembled upon the removal of shaft A and sleeve 1, or upon the separation of the latter members and sleeve 2. This is especially advantageous where there is a great number of rolls employed in the bearing and the rolls and alining shafts are in semi-tight or loose engagement. The lower part of the annular casing formed by the outer bearing member or sleeve 2 and plates 9 and 10, is preferably used as an oil well or reservoir, from which the oil or lubricant will be lifted by the series of rolls B, C and D, in the rotation thereof about the axis of the bearing, and circulated through and distributed to all parts of the bearing.

The construction shown in Figs. 1 and 2 and described above is especially adapted for use where the roller bearing is disposed between a rotatable shaft and a stationary box or journal, in which case the sleeve 2 is rigidly secured within such box or journal.

Figure 3:
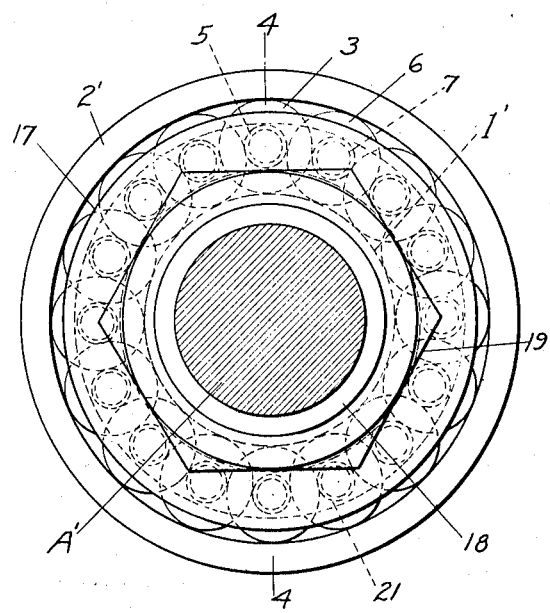
Fig. 3 is a view similar to Fig. 1, of a modified form of my invention, showing a roller bearing assembled about a shaft or spindle.
Figure 4:
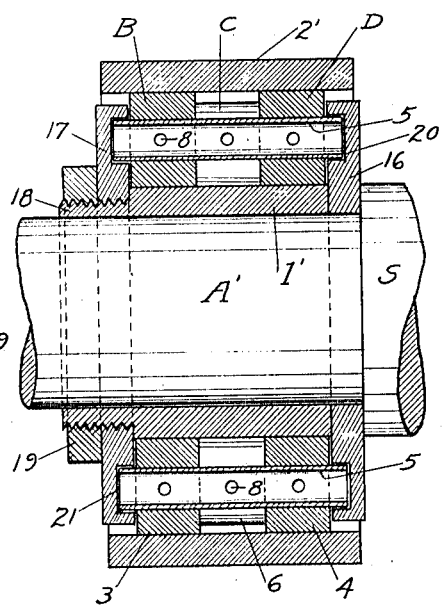
Fig. 4 is a sectional view taken on line 4—4 of Fig. 3, the shaft or spindle shown in elevation.

Referring to Figs. 3 and 4, reference character A' represents the reduced portion of a shaft or axle S, to which a hardened sleeve or cylindrical inner bearing member 1' is suitably rigidly secured. Between the sleeve 1' and an outer hardened sleeve or cylindrical bearing member 2' is disposed the roller bearing comprising the rolls 3, 4 and 6 and alining shafts 5 and 7, said rolls and alining shafts being assembled and functioning in the sme manner as in the construction of Figs. 1 and 2. An annular plate 16 is rigidly secured to the reduced portion A' between the shoulder formed thereby on axle S and one end of sleeve 1', and a similar plate 17 is secured to the sleeve 1' adjacent the other end thereof as by being threaded on the reduced screw threaded end portion 18 of this sleeve, a lock nut 19 threaded on the screw-threaded portion 18 serves as means for locking the plate 17 in adjusted position on sleeve 1'. The plates 16 and 17 are preferably of the same outside diameter, which is somewhat less than the internal diameter of the sleeve or bearing member 2'. The opposed inner surfaces of the plates 16 and 17 lie closely adjacent the respective end roll surfaces of the bearing and are respectively provided with annular grooves 20 and 21 in which the extending end portions of the alining shafts 5 and 7 are respectively disposed and loosely fit. The plates 16 and 17 coact with the rolls and alining shafts to prevent any substantial relative longitudinal movement thereof in the operation of the bearing while offering no resistance to such operation. The plates 16 and 17 also act to transmit any end thrust imposed on the roller bearing by the sleeve 2', to the sleeve 1' and axle S. Also, when sleeve 2' is removed or such sleeve and the portion A' with its sleeve 1' are separated, the walls of grooves 20 and 21 of plate 16 and 17 coact with the extending end portions of shafts 5 and 7 to maintain the bearing properly assembled about sleeve 1' and prevent the rolls and alining shafts from falling apart.

The threaded connection of plate 17 with sleeve 1' provides for adjustment of this plate to proper position and to compensate for wear of the parts.

The construction of Figs. 3 and 4 is especially adapted for use where a roller bearing is disposed between a stationary axle or spindle and a rotatable wheel or sheave, in which case the sleeve 2' is rigidly secured within the hub of the wheel or sheave.

While I have described the preferred embodiments of my invention, it is to be understood that the same are subject to many changes and modifications without departure from the spirit of the invention or the scope of the appended claims.

Having now described my invention which I claim and desire to protect by Letters Patent is as follows:

1. In a device of the class described, a pair of concentric relatively rotatable members, a plurality of annular series of rolls disposed between said members, the rolls in adjacent series being in staggered relation, shafts on which the rolls of each series are respectively mounted and which coact with the rolls to maintain the same in such staggered relation, said shafts extending beyond the end roll surfaces of the bearing, and means applied to one of said members and provided with annular shoulders respectively disposed adjacent to the extending end portions of said shafts and adapted to coact with the latter to maintain the rolls in assembled position.

2. In a device of the class described, a pair of relatively rotatable members, an annular series of rolls disposed between said members, shafts on which said rolls are respectively loosely mounted and which extend beyond the end roll surfaces of the bearing, and means applied to one of said members and coöperative with the extending end portions of said shafts to maintain the rolls of the bearing in assembled position, said means coacting with said rolls independently of said shafts to transmit end thrusts from one to the other of said members.

3. In a roller bearing, a pair of relatively rotatable members, an annular series of rolls disposed between said members, shafts on which said rolls are loosely mounted, said shafts being unattached to each other and said rolls and shafts coacting so as to be maintained in proper relative position, and means coacting with one of said members to form an oil well in which a portion of the bearing runs, said means coacting with said rolls independently of said shafts to transmit end thrusts from one to the other of said members.

4. In a device of the class described, a pair of relatively rotatable concentric members, an annular series of rolls disposed between said members, shafts on which said rolls are respectively mounted, and a pair of devices applied to one of said members and respectively adapted to transmit end thrusts from one to the other of said members independently of said shafts, said devices being provided with means adapted to directly coact with said shafts to maintain the latter in proper relative position.

5. In a device of the class described, a pair of relatively rotatable concentric members, a plurality of annular series of rolls disposed between said members, shafts on which the rolls of each series are respectively mounted, the shafts and rolls of each series coacting with the rolls and shafts of adjacent series to maintain the rolls of adjacent series in staggered relation, and means secured to one of said members adapted to maintain the said shafts and rolls in proper assembled position upon the removal of the other of said members.

6. In a roller bearing, a pair of relatively rotatable members, a series of rolls disposed between said members, shafts on which said rolls are respectively loosely mounted, said shafts being unattached to each other and said rolls and shafts coacting with each other so as to be maintained in proper relative position, and a device applied to one of said members and adapted to transmit end thrusts from one to the other of said members independently of said shafts.

This specification signed and witnessed this 27th day of June 1917.

ORLANDO W. HART.

Witness:
STANLEY L. SEDNEY, Jr.